United States Patent Office 3,297,401
Patented Jan. 10, 1967

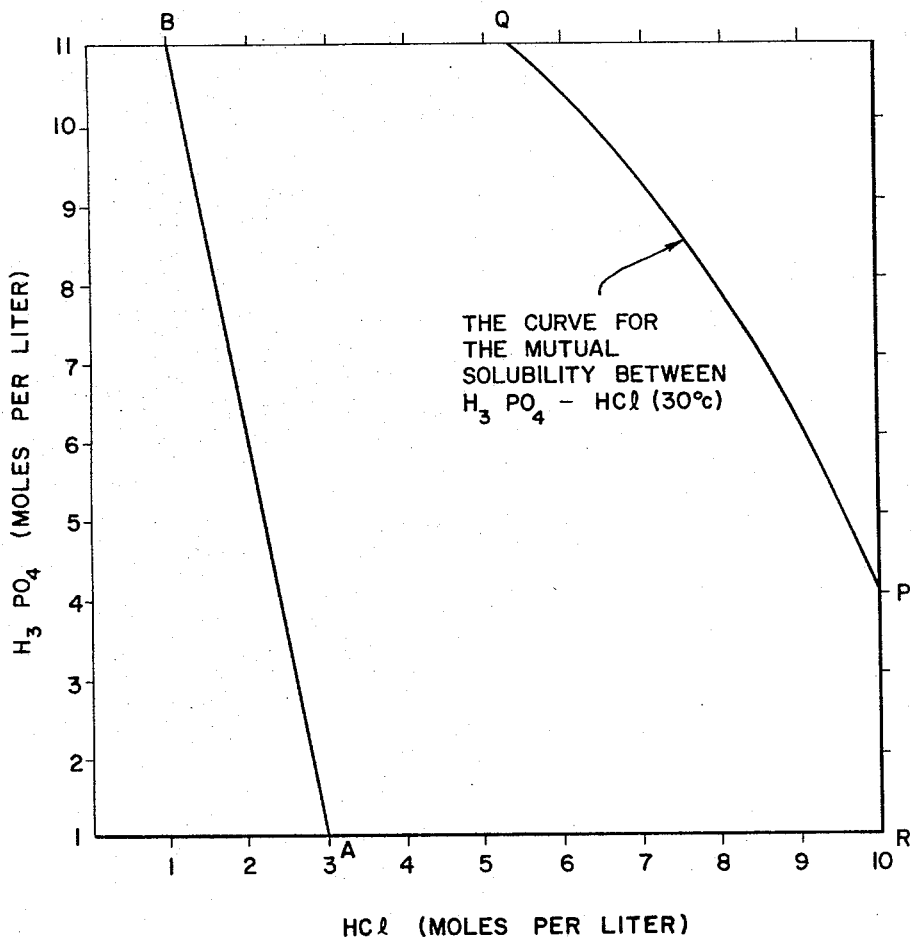

3,297,401
PROCESS FOR REFINING PHOSPHORIC ACID PREPARATIONS
Toshio Sakomura and Mitsuo Kikuchi, Tsuno-gun, Yamaguchi-ken, and Hiroshi Shimizu, Tokyo, Japan, assignors to Toyo Soda Mfg. Co., Ltd., and Japan Organo Co., Ltd, both of Tokyo, Japan
Filed Dec. 21, 1965, Ser. No. 515,334
Claims priority, application Japan, Nov. 10, 1960, 35/45,131; Aug. 18, 1961, 36/29,894
2 Claims. (Cl. 23—165)

The present application is a continuation-in-part of copending Ser. No. 150,089, filed on November 3, 1961, and now abandoned.

The present invention relates to a process for removing iron and arsenic impurities from phosphoric acid produced e.g. by the so-called wet process.

In general, commercially available phosphoric acid is manufactured by two methods. One method is the "dry method," the other is the "wet process" method. Phosphoric acids used for industrial purposes have been heretofore, without exception, produced by the dry process, because phosphoric acid produced by the wet process contains a great deal of impurities and, therefore, could only be used as a raw material for fertilizers and certain types of phosphate compounds.

Of the impurities contained in the phosphoric acid produced by the wet process, the most serious are iron and arsenic because the presence of these impurities is what has restricted the industrial use of wet process phosphoric acid. It is, therefore, not surprising that a great deal of research has been done in an attempt to discover an adequate method for removing iron and arsenic from phosphoric acid. One process which has been developed involves charging the phosphoric acid with hydrogen sulfide gas, thereby precipitating the arsenic as $As_2S_3$ or $As_2S_5$.

After the $As_2S_3$ or $As_2S_5$ is precipitated, the excess hydrogen sulfide is expelled, whereby fine sulfur particles are produced. Since it is very difficult to filter these sulfur particles, this method is not satisfactory for industrial use.

As to the removal of iron from phosphoric acid, no satisfactory method has yet been developed.

A satisfactory purification process for phosphoric acid must be capable of producing a phosphoric acid containing not more than 1 part per million (herein p.p.m.) of iron nor more than 1 p.p.m. of arsenic and, moreover, must do so in an economical manner.

The primary object of the present invention is the embodiment of a process for removing iron and arsenic from wet process phosphoric acid which fulfills the enumerated desiderata.

More particularly, it is an object of the present invention to embody a process in which the iron and arsenic content of wet process phosphoric acid can be reduced to 1 p.p.m. or less.

Another object of the present invention is to provide a process for the removal of iron and arsenic from dilute phosphoric acid so that the iron and arsenic content, individually, is 1 p.p.m. or less and, concurrently, produce a concentrated phosphoric acid.

Other objects of the present invention will be apparent from the following description and appended drawing.

Briefly stated, the present invention essentially realizes the aforementioned objects by adding an appropriate amount of hydrogen chloride, either as a gas or as an aqueous solution, to the phosphoric acid, contacting the thus-produced acid mixture with a weakly basic liquid anion exchanger, and concentrating the mixed acid by, e.g. evaporation, thereby forming volatile $AsCl_3$ from any arsenic remaining in the mixed acid.

During the concentration the arsenic is volatilized and removed from the system together with hydrochloric acid. Thus, it is possible to remove iron and arsenic from a solution of dilute phosphoric acid, such as the acid produced by the wet process. It is therefore, possible to purify and concentrate the dilute phosphoric acid.

The present invention is founded, inter alia, on the discovery that iron can more effectively be removed from an acid mixture (herein mixed acid) having a certain ratio of phosphoric acid and hydrochloric acid, by contacting the mixed acid with a weakly basic liquid anion exchanger.

This mixed acid can be easily prepared by introducing hydrogen chloride gas into a solution of phosphoric acid or into a mixed solution of phosphoric acid and hydrochloric acid, or by mixing an aqueous hydrochloric acid solution with the phosphoric acid.

As noted supra, by the process of this invention, it is possible to remove iron to the extent that the iron content of the phosphoric acid solution, or the mixed solution of phosphoric acid and hydrochloric acid, is less than 1 p.p.m. When removing arsenic as well as iron from the dilute phosphoric acid, the content of iron and arsenic in the phosphoric acid may be lowered to less than 1 p.p.m. At the same time, it is possible to concentrate the dilute phosphoric acid.

In accordance with the present invention, the mixture of phosphoric acid and hydrochloric acid is produced by blowing hydrogen chloride gas into dilute phosphoric acid or by mixing an aqueous hydrochloric acid solution with dilute phosphoric acid, and the thus produced acid mixture is contacted with an anion exchanger. At this time, the higher the concentration of hydrochloric acid in the mixed acid, the easier iron can be removed from the mixture by anion exchangers. Further, a smaller amount of the weakly basic liquid anion exchanger is required for the removal of iron. Moreover, it has been found that, even if the concentration of hydrochloric acid remains in the same degree, the higher the concentration of phosphoric acid, the more iron is extracted by the same amount of exchanger.

As shown in the tables infra (Tables 1 and 2), when the concentration of phosphoric acid is low and the concentration of hydrochloric acid is increased, a smaller amount of exchanger is required. The data in said tables also shows that the higher the concentration of phosphoric acid, the easier it is to remove iron, even if the concentration of hydrochloric acid is less.

This result is illustrated by the fact that anion exchangers will not remove iron from a phosphoric acid solution per se, but, rather, the anion exchanger removes iron only from a mixed solution of phosphoric acid and hydrochloric acid. This is believed to be due to the fact that iron, in the acid mixture is in the form of an anionic complex, probably a chloroferric complex, and the phosphoric acid in the acid mixture acts as an accelerator for formation of said complex anion.

When the concentration of phosphoric acid is high, a smaller amount of hydrochloric acid is sufficient. In addition, as the solubility of hydrochloric acid in phosphoric acid is less at higher temperatures, hydrochloric acid gas can be removed merely by raising the temperature. However, an extremely high concentration of phosphoric acid is not advisable since the amount of hydrochloric acid gas absorbed by phosphoric acid is limited.

Therefore, in forming the aforementioned acid mixture, it is preferable that the concentration of phosphoric acid and hydrochloric acid in the mixture be in the range of 1 to 11 moles per liter (herein mol/l.) and 10 to 1 mol/l., respectively.

The amount of phosphoric acid contained in the crude product produced by the wet process is generally 3 to 6 mol/l. This must be purified and concentrated up to about 85% (by weight), in order to produce an industrial grade of phosphoric acid. According to this invention, a mixture of acids is prepared by charging hydrogen chloride gas into the dilute phosphoric acid and then the thus-obtained mixture is contacted with a weakly basic liquid anion exchanger.

All of the iron and part of the arsenic is removed in the above steps. In the concentrating step, the remaining arsenic can be removed, together with hydrogen chloride, and concentrated phosphoric acid free from iron, arsenic and hydrogen chloride is obtained.

As mentioned above, in the prior method for removing arsenic it is necessary to precipitate and separate the arsenic as $As_2S_3$ or $As_2S_5$. According to this invention, this is not required because when the mixed acid is treated with the aforementioned anion exchanger, a part of the As is extracted into the liquid anion exchanger and removed together with iron. The removal of the remaining arsenic is completed in the later process of concentration.

When hydrochloric acid is absorbed, arsenic is considered to exist in the form of $AsCl_3$. As seen in the table below, $AsCl_3$ (arsenic trichloride) is volatile and, therefore, expelled from the system during the concentration step.

| Temperature (° C.) | 61.1 | 83.4 | 101.1 | 122.0 |
|---|---|---|---|---|
| Vapor pressure (mm. Hg) | 145.1 | 270.6 | 452.2 | 776.0 |

The weakly basic liquid anion exchangers of this invention are anion exchangers which are particularly suitable for use in the solvent extractions of anions or anionic complexes from acidic solution. Preferably, the liquid anion exchangers have functional groups which are primary, secondary, or tertiary amines; however, the particular salt form of the liquid anion exchanger is of no particular importance since the initial salt form will be changed to the $Cl^-$ form or $PO_4^-$ form when contacted with the mixed acid of this invention.

As has been pointed out supra, the amount of iron which can efficiently be removed is dependent upon the relative concentrations of phosphoric acid and hydrochloric acid. The range of the concentration within which the iron is easily removed when using the weakly basic liquid anion exchanger is in the area bounded by the lines connecting the points A, B, Q, P, and R as shown in the appended drawing wherein the line AB is a straight line joining the point A, which corresponds to a composition containing 1.0 mole per liter of $H_3PO_4$ and 3.0 moles per liter of HCl, and the point B, which corresponds to a composition containing 11.0 moles per liter of $H_3PO_4$ and 1.0 mole per liter of HCl.

The following examples are presently preferred embodiments. All percentages are by weight, unless otherwise indicated.

In the following examples Amberlite LA-1 is used as the weakly basic liquid anion exchanger.

Amberlite LA-1 is a liquid secondary aliphatic amine, particularly adapted for use in the solvent extraction of anions or anionic complexes from acidic solutions.

Amberlite LA-1 is a high molecular weight, oil soluble secondary amine supplied as a liquid in the free-base form.

The high molecular weight and the structural configuration, which consists of two highly branched aliphatic chains attached to the nitrogen atom, impart excellent solubility in most organic solvents and extremely low solubility in aqueous solutions.

These solubility characteristics, together with the ability of secondary amines to react with acids to form the corresponding amine salts, make possible the removal of acidic constituents from an aqueous solution.

Furthermore, the anions which are associated with the amine salt in the organic phase are free to enter into an exchange reaction with other anions in an aqueous solution to form a new, oil-soluble but water-insoluble amine salt.

In this manner, many continuous, counter current ion exchange processes can be realized.

CHEMICAL AND PHYSICAL CHARACTERISTICS

The pertinent properties typical of Amberlite LA-1 produced in commercial quantities are summarized in the following table.

Molecular weight _____ 351 to 393.
Acid binding capacity (extraction
  capacity), meq./milliliter _____2.1 to 2.3.
Density (25° C.), g./cm.³ _____ 0.84.
Appearance _____ Clear, amber-liquid
                                            liquid.

SOLUBILITY

Both the free-base and the salt forms of Amberlite LA-1 have extremely low solubility in acidic, neutral and alkaline solutions.

The solubility is approximately 10 to 20 p.p.m.

In an organic solvent Amberlite LA-1 has excellent solubility characteristics in petroleum distillates, aliphatic and aromatic hydrocarbons, high molecular weight alcohols and many other organic solvents.

EXTRACTION BY LIQUID ANION EXCHANGER

Whenever metals exist in an anionic form, there is an excellent possibility that Amberlite LA-1 can be used for their removal.

The following two reactions illustrate the manner in which ferric iron, a common contaminant of phosphoric acid solution, can be removed by preparing the mixed acid of phosphoric acid and hydrochloric acid and then by contacting with Amberlite LA-1:

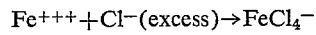

$$FeCl_4^- + (R'R''NH_2Cl)_{org} \rightarrow (R'R''NH_2FeCl_4)_{org} + Cl^-$$

The ferric chloride complex is believed to be formed in the mixed acid, shown in the above equation.

This ferric chloride complex is easily hydrolyzed when the chloride concentration is reduced; and as a result, the iron can be removed from the organic phase by using water as stripping agent. This is illustrated in the following reaction:

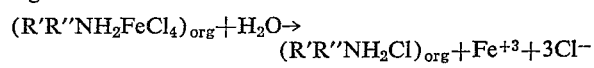

CHOICE OF DILUENT

Since Amberlite LA-1 and its salts are compatible with many organic solvents, the selection of a diluent for the amine is primarily a matter of convenience.

Kerosene has been demonstrated to be very satisfactory whenever the amine is used for processing dilute aqueous solutions where the solvent losses due to entrainment are a significant economic consideration.

If kerosene should be avoided because of toxicity problems, the lower boiling, low molecular weight hydrocarbons may be used.

STRIPPING AGENTS

Whenever it is desirable to perform extractions with the amine in the free-base form, a basic stripping agent, such as sodium carbonate, sodium hydroxide, ammonium hydroxide or even dry ammonia gas may be employed. At times, a lime or magnesia slurry may be preferred.

A salt, a slightly acidified salt or an acid solution may be used for stripping should extraction with the amine in the salt form be desired.

There are also certain conditions where water alone may be used for stripping the extracted component from the organic phase. These conditions are usually encountered when certain metals form anionic complexes in concentrated salt or acid solutions but do not form these complexes in dilute solutions. The salt form of the amine is usually employed for extraction in these cases.

*Example 1*

A series of aqueous solutions containing orthophosphoric acid and hydrochloric acid as shown in the following Table 1 were prepared.

Each of the mixed acids, contained ferric ion in an amount of fifty milligrams per liter in the water phase after contacting with the liquid anion exchanger.

200 milliliters of each of the mixed acids were shaken with 50 milliliters of extractive solvent containing 10% by volume of Amberlite (registered trademark) LA–1 (catalogue name), 85% by volume of kerosene and 5% by volume of n-dodecylalcohol.

After vigorous shaking for 20 minutes, the mixture was transferred into separation funnel and allowed to separate into two phases. The anion exchange liquid was in the upper layer and the mixed acid solution in the lower layer.

The iron content of each phase was determined, and the extraction factor calculated.

Results of the experiment are shown in Table 1.

TABLE 1

| Composition of mixed acid | | Extraction Factor |
|---|---|---|
| HCl mol/l. | H₃PO₄ mol/l. | |
| 1 | 0 | 0.05 |
| 1 | 4 | 0.1 |
| 1 | 6 | 0.2 |
| 1 | 8 | 0.5 |
| 1 | 9 | 1 |
| 1 | 10 | 5 |
| 2 | 0 | 0.20 |
| 2 | 4 | 1.1 |
| 2 | 6 | 5 |
| 2 | 8 | 18 |
| 2 | 9 | 30 |
| 2 | 10 | 40 |
| 3 | 0 | 8 |
| 3 | 4 | 12 |
| 3 | 6 | 29 |
| 3 | 8 | 68 |
| 3 | 9 | 100 |
| 3 | 10 | 130 |
| 4 | 0 | 33 |
| 4 | 4 | 44 |
| 4 | 6 | 68 |
| 4 | 8 | 114 |
| 4 | 9 | 152 |
| 4 | 10 | 200 |
| 5 | 0 | 53 |
| 5 | 4 | 80 |
| 5 | 6 | 113 |
| 5 | 8 | 150 |
| 5 | 9 | 192 |
| 5 | 10 | 220 |
| 6 | 0 | 74 |
| 6 | 4 | 120 |
| 6 | 6 | 140 |
| 6 | 8 | 180 |
| 6 | 9 | 205 |
| 6 | 10 | X |
| 7 | 0 | 94 |
| 7 | 4 | 153 |
| 7 | 6 | 190 |
| 7 | 8 | 211 |
| 7 | 9 | X |
| 8 | 0 | 120 |
| 8 | 4 | 186 |
| 8 | 6 | 220 |
| 8 | 8 | X |
| 9 | 0 | 151 |
| 9 | 4 | 208 |
| 9 | 6 | X |
| 3 | 1 (Point A) | 10 |
| 1 | 11 (Point B) | 12 |
| 10 | 4 (Point P) | 253 |
| 5.25 | 11 (Point Q) | 248 |
| 10 | 1 (Point R) | 220 |

The symbol X in the above table signifies that it is impossible to prepare such a composition of mixed acid at room temperature (30° C.) due to the limited solubility of hydrochloric acid in the phosphoric acid.

The term "extraction factor" used herein is defined in the following formula:

Extraction factor =

$$\frac{\text{Concentration of Fe extract (mg./l)}}{\text{Concentration of Fe in mixed acid (mg./l.)}}$$

Accordingly, the larger the extraction factor is, the greater the amount of iron is extracted by contacting with the extractive solvent composed of liquid anion exchanger.

According to the above-described table, it is clear that, the higher the concentration of hydrochloric acid is, the larger the extraction factor and extracting capacity.

Further, the higher the concentration of phosphoric acid in mixed acid, the larger the extraction factor and extracting capacity by contacting the said mixed acid with extracting solvent composed of liquid anion exchanger.

Table 2, infra, shows the extraction factor per se and the extraction capacity as a function of phosphoric acid concentration in the mixed acid.

The mixed acids in Table 2 are a series of acids having equal concentrations of hydrochloric acid (moles per liter), but having phosphoric acid concentrations ranging from 4 to 9 moles per liter.

TABLE 2

| Concentration of H₃PO₄ in mixed acid mol/l. | Extraction factor | Extraction capacity |
|---|---|---|
| 0 | 33 | 0.57 |
| 4 | 44 | 0.98 |
| 6 | 62 | 1.26 |
| 8 | 114 | 2.06 |
| 9 | 152 | 2.25 |

The term "extraction capacity" used in above table is defined as the millimoles of iron extracted per milliliter of Amberlite LA–1.

From the above table it is clear that, even when the concentration of hydrochloric acid is the same, the extraction factor and extraction capacity become larger as the phosphoric acid concentration is increased.

The maximum extraction capacity of the liquid anion exchanger used in this example was 2.30 milliequivalents per milliliter.

Accordingly, the extraction capacity in the mixed acid having 4 moles per liter of HCl and 9 moles per liter of H₃PO₄ was equal to the maximum extraction capacity, and all of the functional groups of the liquid anion exchanger are therefore occupied by a chloroiron complex anion.

*Example 2*

A kerosene solution of liquid anion exchanger was prepared by mixing 10 parts by volume of Amberlite LA–1 with 90 parts by volume of kerosene. 30 ml. of this kerosene solution was mixed with 100 ml. of a mixed acid solution of the following composition.

H₃PO₄ _____ mols/l__ 5.80
HCl _____ do____ 8.44
Fe _____ mg./l__ 950
As _____ mg./l__ 4

The mixture thus prepared was thoroughly shaken for 20 minutes at room temperature, and was transferred into a separation funnel and allowed to separate into two phases, the anion exchange liquid being in the upper layer and the mixed acid solution being in the lower layer.

The mixed acid solution (100 ml.) was withdrawn through the bottom of the funnel. There was no change in volume. The Fe content thereof was 8 mg./l. 99% or more of the total amount of iron contained before the treatment was transferred to the anion exchange liquid layer. 20 ml. of kerosene solution of the newly prepared liquid anion exchanger was added to this mixed acid. After it was thoroughly shaken, the same process as mentioned above was repeated. As a result, the Fe content of the mixed acid solution was decreased to 0.5 mg./l. or less. At the same time, the arsenic content was reduced to 3.5 mg./l.

The remaining 30 ml. of anion exchange liquid layer was then mixed with 100 ml. of water and shaken. A major portion of the iron was transferred into the water layer, and the anion exchange liquid layer was thus regenerated and thus can be used repeatedly. Any of the processes mentioned above, can also be carried out by the counter current method of liquid exchange. The iron-free mixed acid solution obtained was evaporated, in an evaporating flask, and a phosphoric acid having the following composition was obtained (wherein all percentages are by weight):

| | | |
|---|---|---|
| $H_3PO_4$ | percent | 85 |
| HCl | do | 0.1 |
| Fe | p.p.m. | 0.7 |
| As | p.p.m. | 0.01 |
| Weight | grams | 67 |
| Volume | ml | 39 |
| Specific gravity | | 1.7 |

*Example 3*

A mixed solution containing:

| | | |
|---|---|---|
| $H_3PO_4$ | mols/l | 8.0 |
| HCl | do | 2.7 |
| Fe | mg./l | 503 | was treated with an extractive solvent comprising 10 parts by volume of Amberlite LA–1, 85 parts by volume of kerosene and 5 parts by volume of n-dodecylalcohol, according to the multistaged counter current extraction method, at flow rate of 900 ml./hour of mixed acid and 180 ml./hour of extractive solvent. As a result, the Fe content in the mixed acid solution was reduced to less than 1.0 mg./l. in the fourth stage of the counter current extraction.

In this example n-dodecylalcohol in the extractive solvent, was used as an accelerating agent for phase separation.

*Example 4*

A mixed acid solution having the following composition was prepared by charging hydrogen chloride gas into phosphoric acid.

| | | |
|---|---|---|
| $H_3PO_4$ | mols/l | 8.0 |
| HCl | do | 2.6 |
| Fe | mg./l | 520 |

An extractive solvent the same as in Example 3 was prepared.

The mixed acid solution described above and the extractive solvent were contacted in a four stage counter current extractor, continuously for five hours, at flow rate of 500 ml./hour and 165 ml./hour respectively.

The content of Fe in acid phase was determined at each stage as shown in Table 3.

TABLE 3

| Number of stage: | Fe content in acid phase, mg./l. |
|---|---|
| 1 | 51.6 |
| 2 | 4.1 |
| 3 | 1.4 |
| 4 | 0.4 |

The extractant phase had the following composition:

| | | |
|---|---|---|
| Fe in the extractant phase | mg./l | 1550 |
| Specific gravity | | 0.803 |

The above extractant was contacted with 0.5 N HCl solution, at a flow rate of 360 ml./hour and 360 ml./hour respectively, in a four stage counter current extractor.

The Fe in the extractant was thus transferred to the eluant solution.

The Fe content in each phase was determined at each stage as shown in Table 4.

TABLE 4

| Number of stage | Fe content in extractant phase, mg./l. | Fe content in eluant, mg./l. |
|---|---|---|
| 1 | 21.7 | 1,550 |
| 2 | 3.4 | 67.5 |
| 3 | 1.0 | 11.6 |
| 4 | 0.2 | 2.2 |

Regenerated extractive solvent free from iron was effectively obtained by this washing operation, and this solvent can be used again as extractive solvent in the above illustrated operation.

In this example 0.5 N HCl solution as eluant was used, however, water free of acid can also be used.

Having thus disclosed the invention what is claimed is:

1. A process for removing iron and arsenic from crude phosphoric acid, which comprises charging said crude phosphoric acid with hydrochloric acid, mixing weakly basic liquid anion exchanger with the resultant mixture, separating the weakly basic liquid anion exchanger containing substantially all the iron impurity and part of the arsenic impurity from the partially purified phosphoric acid mixture, and concentrating said partially purified phosphoric acid mixture by evaporation, thereby removing substantially all the hydrochloric acid and remaining arsenic by evaporation to produce concentrated phosphoric acid.

2. A process according to claim 1 wherein the mixture of phosphoric acid and hydrochloric acid is in concentrations falling within the area bounded by the lines connecting the points A, B, Q, P, and R as shown in the appended drawing.

References Cited by the Examiner

UNITED STATES PATENTS

| 2,415,797 | 2/1947 | Low | 23—165 |
| 2,695,875 | 11/1954 | McGarvey | 210—24 |
| 2,830,874 | 4/1958 | Long et al. | 23—18 |
| 2,955,918 | 10/1960 | Ruehrwein | 23—165 |

OSCAR R. VERTIZ, *Primary Examiner.*

O. F. CRUTCHFIELD, *Assistant Examiner.*